2,814,823

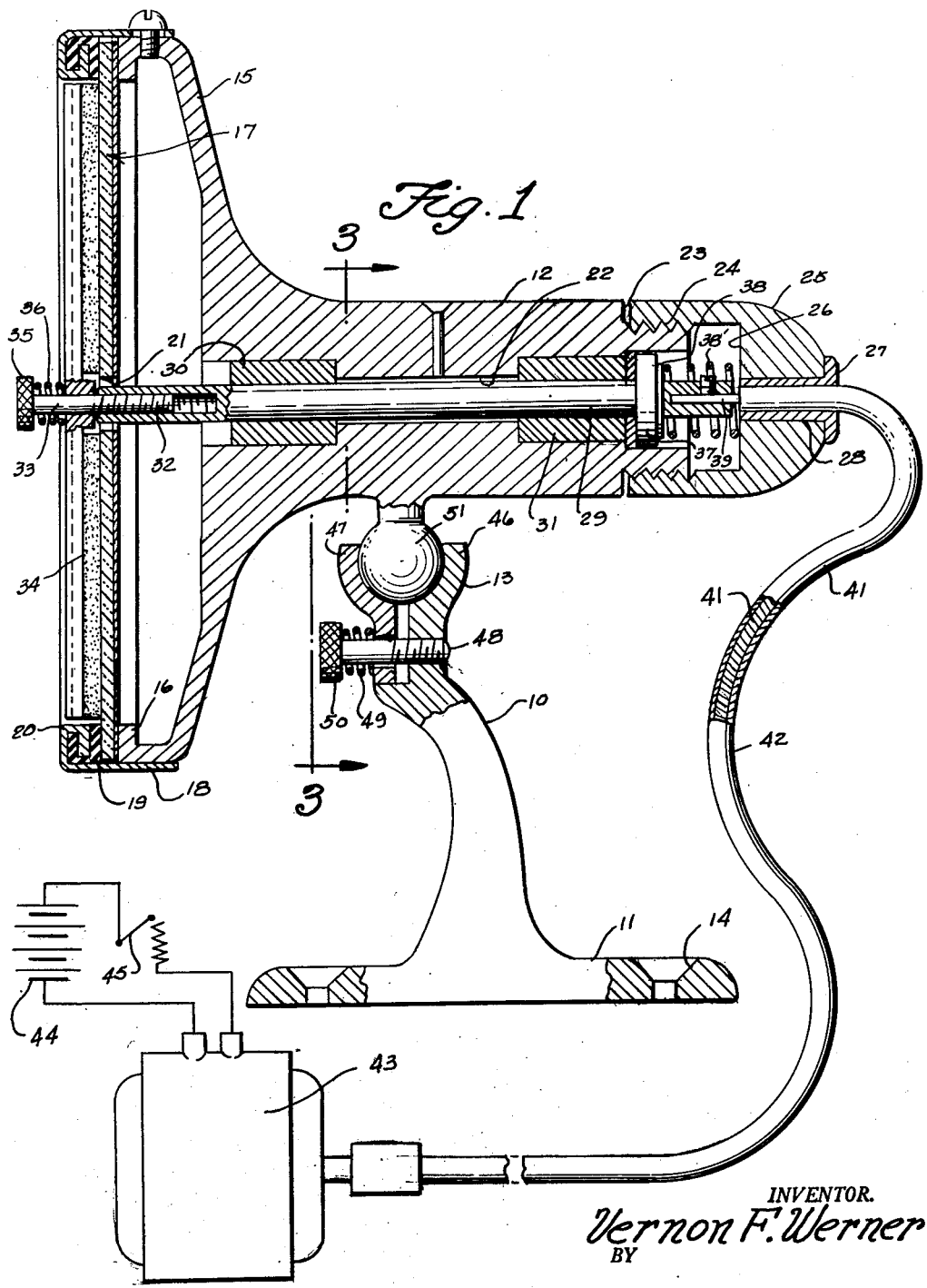

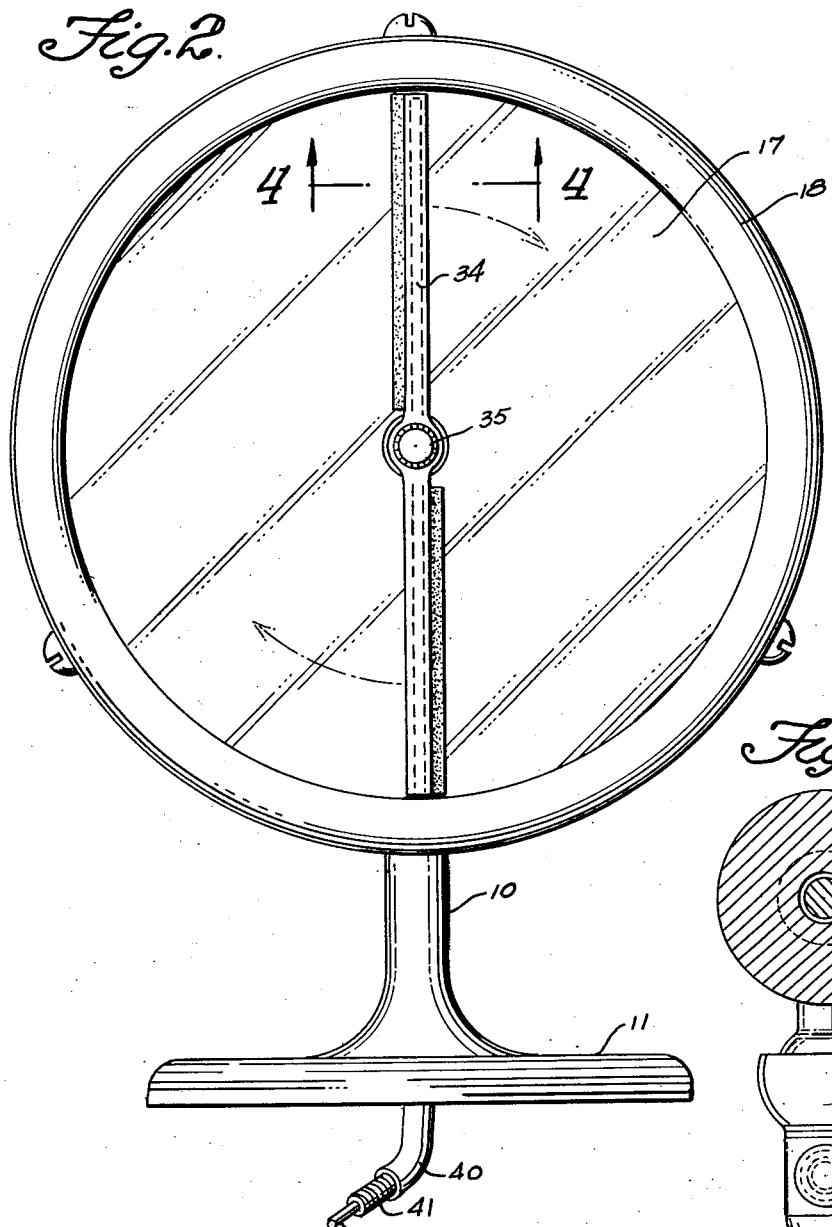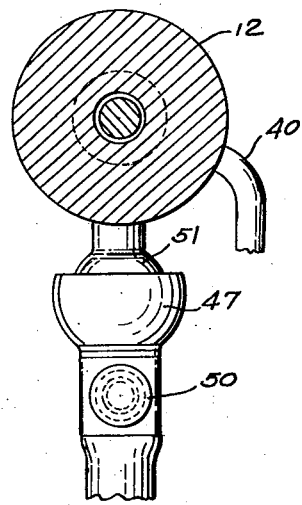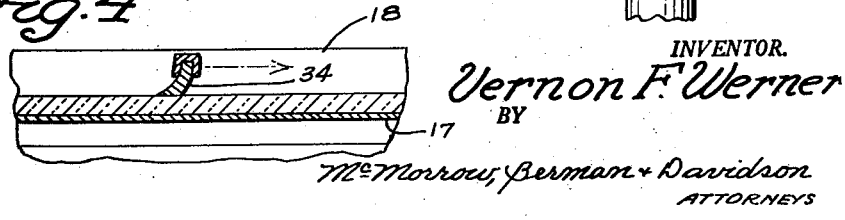

REAR VIEW MIRROR WIPER ASSEMBLY

Vernon F. Werner, Mountlake Terrace, Wash.

Application November 19, 1954, Serial No. 469,953

3 Claims. (Cl. 15—250)

The present invention relates to rear view mirrors for automotive vehicles.

The primary object of the present invention is to provide a rear view mirror wiper assembly for universal use on all automotive vehicles, and one having a remotely located motor means for driving the wiper.

Another object of the present invention is to provide a rear view mirror having a wiper driven by a flexible shaft.

A further object of the present invention is to provide a rear view mirror of sturdy and inexpensive construction, one which may be assembled by a person relatively unskilled and without the use of special tools.

These and other objects and advantages of the present invention will be fully apparent from the following description when taken in connection with the annexed drawings, in which:

Figure 1 is a view partially in cross-section of the present invention as seen from one side, Figure 2 is a front view in elevation of the present invention, Figure 3 is a partial view in cross-section on line 3—3 of Figure 1, and Figure 4 is a vertical view on line 4—4 of Figure 2.

Referring in greater detail to the drawing in which like numerals indicate like parts throughout the several views, the invention is seen to consist of a standard 10 having a base 11 at one end thereof and connected to a casing 12 disposed adjacent the other end of the standard 10.

A ball and socket joint indicated by the reference numeral 13 connects the casing 12 to the standard 10 for universal movement. The base 11 is provided with counter sunk holes 14 by means of which with appropriate screws or bolts the base may be secured to the exterior of an automotive vehicle.

The casing 12 is provided at one end with an enlarged circular portion 15 having an inwardly directed shoulder 16 against which is disposed a circular reflective member 17, such as a mirror or highly polished metal.

Referring to Figures 1 and 2, it will be seen that a flanged ring 18 overlies the outer end of the one end 15 of the casing 12 and has a gasket 19 interposed between the flange 20 and the periphery of the reflective member 17. The reflective member 17 is provided with an aperture 21 in its center axially aligned with a bore 22 extending from the one end of the casing 12 to the other.

The other end of the casing has a reduced portion 23 provided with exterior threads 24 upon which is threadedly engaged the bushing 25 having a chamber 26 in one end and having the other end provided with a rubber grommet 27 extending into the bore 28 which extends through the bushing connecting with the chamber 26.

A shaft 29 is rotatably supported within the bore 22 on bearings 30 and 31 of the "oilite" type.

The one end of the shaft 29 where it projects from the one end of the casing 12 and through the aperture 21 in the reflective member 17 is provided with an internally threaded bore 32 which is threadedly engaged by a threaded stud bolt 33, the bolt carrying a wiper blade 34 for rotary movement in contact with the exterior face of the reflective member 17. A knurled nut 35 is connected to the stud bolt 33 and compresses a spring 36 to obtain the proper wiping contact of the blade 34.

The other end of the shaft 29 is provided with a shoulder 37. A thrust washer 38 rides on this shoulder and is pressed by the spring 38' against a bearing of material similar to the bearings 30 and 31. This end of the shaft 29 is also provided with a bore into which fits the wire or other rotated element 39 of a flexible shaft member 40 having a conventional outer cable 41 and a plastic protective cover 42. The one end of the flexible shaft is connected to the shaft 29 and the other end is connected to a motor means indicated by the reference numeral 43 in Figure 1. A battery is indicated by the reference numeral 44 for supplying current to the motor 43 which is of the slow speed type and a rheostat switch is in circuit with the motor and the battery in order to control the rotative speed of shaft 29 with its associated wiper blade 34.

The ball and socket joint 13 is composed of a fixed arm 46 and a movable arm 47, each of them having complementally hemispherically shaped inner surfaces and are movable toward and away from each other by means of the stud bolt 48 having a spring 49 and ending in a knurled portion 50 to provide a handy grip for adjusting the movement of the arms 46 and 47 toward each other on each side of the ball 51 which projects from the lower side of the casing 12.

In use, the base 11 is connected to the door frame or window frame or other convenient exterior surface of an automotive vehicle with the reflective member 17 directed to the rear of the vehicle. The wiper blade 34 will be used during conditions of rain, snow, or ice to keep the rear view mirror formed by the reflective member 17 clear so that at all times the operator of the vehicle has a clear vision to the rear.

While only a preferred embodiment of the present invention has been shown and described, other embodiments may be made and practiced within the scope of the appended claims, without departing from the spirit of the invention.

I claim:

1. A rear view mirror for attachment to a vehicle comprising a standard adapted to be secured at one end to the vehicle on the exterior thereof, a casing disposed adjacent to the other end of said standard and connected to said standard for universal movement with respect to said standard, said casing being formed with an axially arranged bore extending from one end of said casing to the other, a reflective member disposed transversely to said bore and secured to said one end of said casing, said member having an aperture axially arranged with respect to said bore, a rotative shaft disposed in said bore and projecting by one end through said aperture and by the other end from said bore, a wiper blade disposed exteriorly of said casing in wiping contact with said reflective member connected to said shaft for rotation therewith, and means operatively connected to the other end of said shaft for rotating said shaft.

2. A rear view mirror for attachment to a vehicle comprising a standard adapted to be secured at one end to the vehicle on the exterior thereof, a casing disposed adjacent to the other end of said standard and connected to said standard for universal movement with respect to said standard, said casing being formed with an axially arranged bore extending from one end of said casing to the other, a reflective member disposed transversely to said bore and secured to said one end of said casing, said member having an aperture axially arranged with respect to said bore, a rotative shaft disposed in said bore and projecting by one end through said aperture and by the other end from said bore, a wiper blade disposed exteriorly of said casing in wiping contact with said reflective member connected to said shaft for rotation therewith, and motor means operatively connected to the other end of said shaft for rotating said shaft.

3. A rear view mirror for attachment to a vehicle comprising a standard adapted to be secured at one end to the vehicle on the exterior thereof, a casing disposed adjacent to the other end of said standard and connected to said standard for universal movement with respect to said standard, said casing having an enlarged one end and an exteriorly threaded other end and being formed with an axially arranged bore extending from one end of said casing to the other, a reflective member transversely arranged with respect to said bore and secured to said one end of said casing, said member having an aperture axially arranged with respect to said bore, a rotative shaft disposed in said bore and projecting by one end through said aperture and by the other end from said bore, a wiper blade disposed exteriorly of said casing adjacent said one end in wiping contact with said reflective member connected to said shaft for rotation therewith, a bushing threadedly engaged to said other end of said casing, a flexible shaft means having an end portion supported in said bushing and operatively connected to said shaft for rotation of the latter, and motor means operatively connected to the other end of said flexible shaft means for rotating said flexible shaft means.

References Cited in the file of this patent
UNITED STATES PATENTS

| | | |
|---|---|---|
| 1,318,839 | Breese | Oct. 14, 1919 |
| 2,268,253 | Hill | Dec. 30, 1941 |
| 2,604,652 | Poindexter | July 29, 1952 |
| 2,622,261 | Smith | Dec. 23, 1952 |
| 2,722,707 | Musselman | Nov. 8, 1955 |